United States Patent [19]

Wiart et al.

[11] 4,423,002

[45] Dec. 27, 1983

[54] APPARATUS FOR CONTROLLING A NUCLEAR REACTOR BY VERTICAL DISPLACEMENT OF A UNIT ABSORBING NEUTRONS

[75] Inventors: Albert Wiart, Sannois; Jacques Defaucheux, Jeumont; Gilbert Pasqualini, Maubeuge; Jean Martin, Chatillon, all of France

[73] Assignee: Framatome, Courbevoie, France

[21] Appl. No.: 214,291

[22] Filed: Dec. 8, 1980

[51] Int. Cl.³ .............................................. G21C 7/12
[52] U.S. Cl. .................................. 376/227; 376/228; 376/233
[58] Field of Search ............... 376/212, 219, 227, 228, 376/233, 235, 277, 327, 353; 335/285, 289

[56] References Cited

U.S. PATENT DOCUMENTS

| | | | |
|---|---|---|---|
| 2,803,761 | 9/1956 | Young | 376/228 X |
| 3,132,290 | 5/1964 | Kumpf | 376/228 X |
| 3,162,796 | 12/1964 | Schreiber et al. | 376/228 X |
| 3,344,034 | 9/1967 | Smith | 376/228 |
| 3,721,462 | 3/1973 | Pawlitzki | 376/233 |
| 3,940,309 | 2/1976 | Imperiali | 376/233 X |
| 4,233,115 | 11/1980 | Jacquelin | 376/353 X |

FOREIGN PATENT DOCUMENTS 1455472  9/1966  France .

*Primary Examiner*—Richard E. Schafer
*Assistant Examiner*—Daniel Wasil
*Attorney, Agent, or Firm*—Pollock, Vande Sande & Priddy

[57] ABSTRACT

Apparatus for controlling a nuclear reactor by vertical displacement of a unit absorbing neutrons, comprising, inside a sealed enclosure (1) in communication with the interior of the reactor, a movable magnetic piece (6) connected to a control shaft (3) which is itself connected to the absorbent unit. This magnetic piece (6) has at least two radial projections (7). The magnetic piece (6) is displaced by an inductor (10) with at least two pole shoes (16) corresponding to the projections (7) on the magnetic piece (6) and allowing magnetic coupling between the inductor (10) and the magnetic piece (6). The inductor (10) and its displacement device (30, 32, 33) are disposed outside the sealed enclosure (1). A control means (38) allows the control shaft (3) to be uncoupled from a member (36, 37) assuring its suspension so as to drop the absorbent unit in the event of emergency shutdown. The apparatus is particularly applicable to control rods of pressurized water nuclear reactors.

5 Claims, 2 Drawing Figures

APPARATUS FOR CONTROLLING A NUCLEAR REACTOR BY VERTICAL DISPLACEMENT OF A UNIT ABSORBING NEUTRONS

The invention concerns an apparatus for controlling a nuclear reactor by vertical displacement of a unit absorbing neutrons inside the core of the reactor and dropping of the absorbent unit into the position of maximum insertion under the action of its own weight for emergency shutdown.

BACKGROUND OF THE INVENTION

To control nuclear reactors, and particularly to control pressurized water nuclear reactors, absorbent units constituted by tubes containing a material which is strongly absorbent of neutrons are displaced inside the core, in the vertical direction between the fuel elements.

These control rods are introduced through the upper end of the core so that a vertical movement downwards corresponds to a reduction in the power supplied by the reactor and a vertical movement upwards corresponds to an increase in the power supplied by the reactor.

In addition, if any accident makes an emergency shutdown necessary, the control rods must be able to drop very rapidly under the action of their weight into maximum insertion position in the reactor core, Any nuclear reactor control apparatus using the vertical displacement of absorbent units such as control rods must therefore be capable of obtaining both accurate displacement of the rods inside the core, with the possibility of stopping in a predetermined position, and instantaneous and very reliable release of these control rods for emergency shutdown.

To obtain their vertical movement, the control rods are usually connected at their upper part to a control shaft which is displaced by means of a mechanism disposed inside a sealed enclosure in communication with the interior of the reactor and containing the exchanger fluid of the reactor, for example pressurized water in the case of pressurized water nuclear reactors.

Various types of mechanism, such as pawl mechanisms and rack-and-pinion mechanisms, have already been proposed for obtaining movement of the control rods. In all cases, these mechanisms are intended to function in a high-temperature and high-pressure environment and in the presence of radiations.

French Pat. No. 1,455,472 discloses an electromagnetic motor whose movable element is constituted by the control shaft itself which bears annular projections disposed so as to form a variable reluctance motor producing a translatory movement entirely without any rotary movement.

However, it has never been possible to make good use of such an apparatus, which avoids utilizing mechanisms disposed inside an enclosure in communication with the interior of the core, because it needs too many coils to constitute the stator part of the motor, and also because it has a low efficiency as a result of magnetic saturation of the shaft due to the axial concentration of magnetic flux. In addition, the energy it consumes in keeping the movable part in position is considerable, which, among other drawbacks, leads to prohibitory overheating and necessitates providing a cooling apparatus.

SUMMARY OF THE INVENTION

The object of the invention is an apparatus for controlling a nuclear reactor by vertical displacement of a unit absorbing the neutrons inside the core of the reactor and dropping of the absorbent unit into maximum insertion position under the action of its own weight for emergency shutdown, the absorbent unit being fixed to the lower end of a vertical control shaft, this control apparatus assuring accurate movements of the absorbent unit in the vertical direction and very reliable release of the control rods, so that they drop in the event of emergency shutdown without use of a mechanical member functioning in a fluid which is at high temperature and/or high pressure and being irradiated, this apparatus also being very simple in construction and functioning reliably.

To this end, the apparatus according to the invention comprises:

(a) inside a cylindrical sealed enclosure with vertical axis in communication with the interior of the reactor, a piece made of magnetic material vertically movable in this enclosure and connected to the upper end of the control shaft, having at least two parts projecting in the radial direction of the enclosure spaced axially and together with the inner wall of the enclosure forming a very small space in the radial direction, (b) outside the sealed enclosure, at least one inductor having at least two pole shoes axially spaced by a distance equal to the space between the projecting parts of the piece made of magnetic material, vertically movable and means for accurate guiding displacement of the inductor in the vertical direction with positioned stops producing a corresponding displacement of the piece made of magnetic material, the pole shoes of the inductor remaining at a very short distance from the enclosure in the radial direction, and (c) means for controlling dropping of the absorbent unit by magnetic uncoupling of a member solid with the control shaft with respect to another member assuring its suspension.

According to a preferred embodiment of the invention, the magnetic piece is so connected to the control shaft as to be detachable, by a connecting device with an electromagnetic control for connecting or separating the magnetic piece and the control shaft, this electromagnetic control constituting the means for controlling dropping of the absorbent unit.

To fully explain the invention, an embodiment of a control apparatus according to the invention, in the case where the inductor is constituted by a set of magnetic circuits with permanent magnets and in which the connection between the magnetic piece and the control shaft is detachable, will now be described by way of example, with reference to the attached drawings.

DETAILED DESCRIPTION

Figure 1:
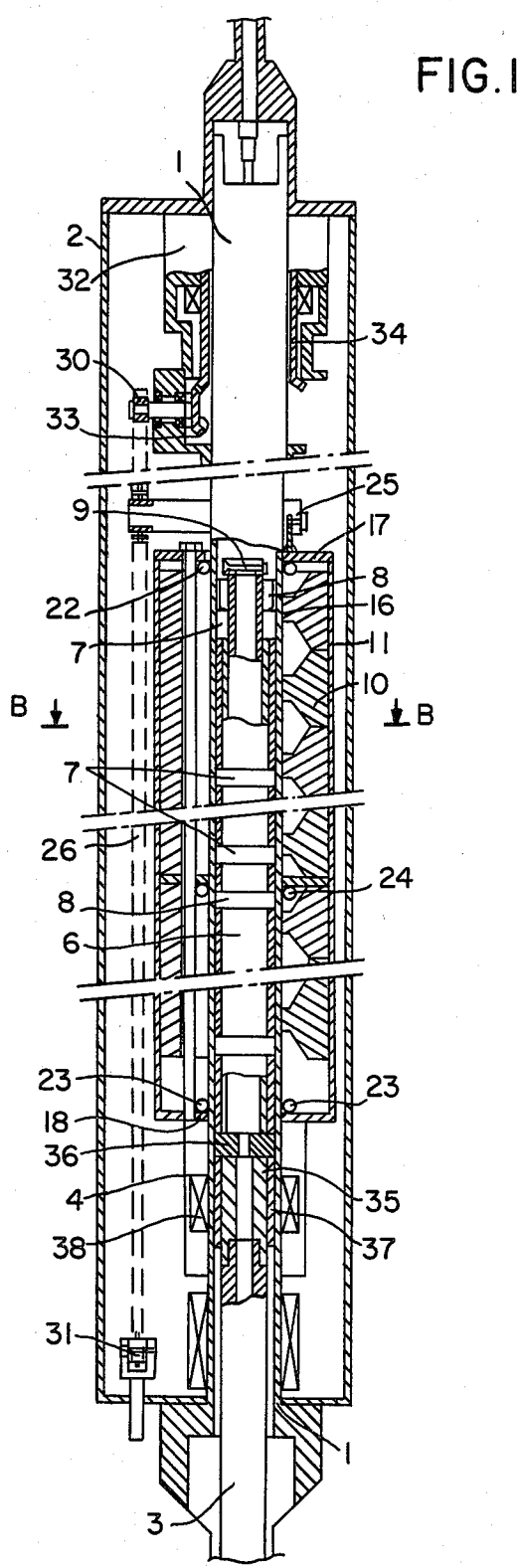
FIG. 1 is a sectional view along line A in FIG. 2 of the apparatus according to the invention.

FIG. 1 shows the casing 1 fixed sealingly on the vessel of the pressurized water nuclear reactor surrounded by a casing 2 with square section is disposed inside which is the whole of the control apparatus. This casing 2 is fixed on the casing 1.

The control shaft 3, which is connected at its lower part (not shown) the absorbent unit and at its upper part, by a device 4 which will be described in more detail, to a magnetic piece 6 which has radial projections 7, enters into the inner part of the sealed enclosure 1.

This magnetic piece 6 is constituted by a hollow central shaft on which large annular pieces made of magnetic steel are slipped in succession, constituting the radial projections 7 and smaller diameter tubular pieces constituting the body of the piece 6. The radial projections are spaced by a constant length in the axial direction of the piece 6. In addition, annular guiding pieces 8 are also slipped on the central shaft, all the pieces slipped on this shaft being held in axial position by means of a clamping system 9 at the upper end of the shaft. The lower end of this central shaft is welded onto an end piece forming part of the fixing device 4.

The annular pieces 8 allow accurate guiding of the piece 6 inside the sealed enclosure 1, while the annular pieces 7 are slightly smaller in diameter than the interior diameter of the enclosure, thus providing a very small clearance in the radial direction between their outer surface and the inner surface of the enclosure 1.

The enclosure 1 is made of magnetic material.

The control shaft 3 and the piece 6 are the only elements of the control apparatus which are inside the enclosure 1.

Figure 2:
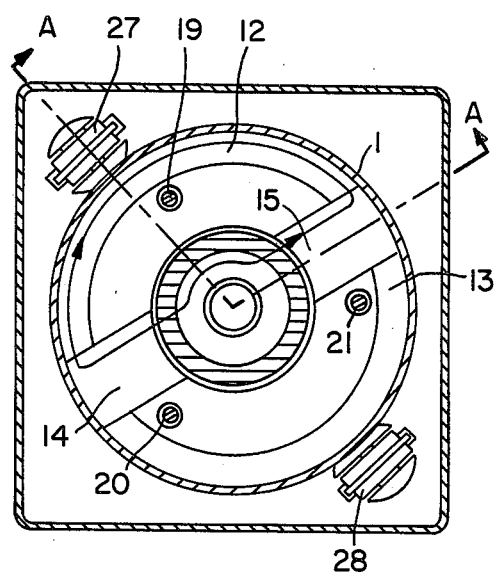
FIG. 2 is a sectional view along line B in FIG. 1.

An inductor, which will be described in further detail with reference to FIGS. 1 and 2, is positioned about the enclosure 1 and inside the casing 2.

This inductor is constituted by a cylindrical sleeve 11 inside which magnetic circuits are stacked one above the other in the axial direction of the apparatus.

As shown in FIG. 2, each of these circuits has two pieces 12 and 13 formed as portions of a ring and constituted by permanent magnets, made for example of Ticonal, and two projecting pole pieces 14 and 15, made of magnetic material.

The set of magnetic circuits is held inside the cylindrical casing 1 by two end plates 17 and 18 and three shafts 19, 20 and 21 fixed at their ends, which pass through the plates 17 and 18.

The inductor-guiding devices 22 and 23 are fixed on the end plates 17 and 18, respectively, while a third guiding device 24 is interposed, at the central part of the inductor, between two magnetic circuits.

The guiding devices 22, 23 and 24 have rollers rolling on the outer surface of the sealed enclosure 1.

The upper plate 17 also bears a suspension device 25 which is itself connected to two chains such as 26 for driving the inductor in a vertical displacement movement by means of driving devices 27 and 28 disposed on either side of the inductor.

Each of the chain-driving devices 27 or 28 has a drive chain wheel such as 30 and a guide chain wheel such as 31 disposed respectively at the upper part and the lower part of the casing 2.

The drive wheels such as 30 are driven by a motor 32 through bevel pinions such as 33.

The motor 32 is fixed at the upper part of the enclosure 2 about the sealed enclosure 1. The movement of the motor is transmitted through a sleeve 34 whose lower part constitutes a bevel pinion engaging with two pinions such as 33. In this way, the two chains move synchronously in the vertical direction to drive the inductor when the motor 32 is started.

The motor 32 is an asynchronous motor equipped with a current-starvation brake which enables accurate displacement of the inductor, with the possibility of stopping in a pre-determined position by cutting off the current.

The inductor has a number of magnetic circuits equal to the number of radial projections 7 on the magnetic piece 6. In addition each of the pole pieces such as 14 and 15, as shown in FIG. 1, on the right-hand side of which these pole pieces have been represented in section at a vertical plane, has a radial projection directed towards the outer surface of the enclosure 1 constituting a pole shoe 16 providing a very small clearance between a pole piece and the sealed enclosure.

Each of the pole shoes 16 has one dimension, in the vertical direction, equal to the height of the annular pieces 7 constituting the radial projections of the magnetic piece 6.

Each of the sets of pole pieces 14 and 15 thus provides projecting parts constituting a sort of toothing with the same pitch as the projections of the magnetic piece 6.

When the magnetic piece 6 is so disposed inside the sealed enclosure 1 that each of the projections 7 is disposed approximately opposite a pole shoe 16, a magnetic flux, substantially radial in direction, passes through the projecting parts of the magnetic piece 6 between the two pole shoes disposed on either side of the sealed enclosure. If the magnetic piece 6, at the lower part of which the control shaft is connected, is allowed to move freely in the vertical direction, the magnetic piece assumes a position like that shown in FIG. 1, corresponding to equilibrium between the weights of the magnetic piece, the shaft and the absorbent unit and the magnetic forces produced at the projecting parts of the magnetic piece and the pole shoes of the inductor, tending to reduce the reluctance opposing the passage of the flux.

It will be understood that, when the inductor undergoes vertical displacements caused by the chain devices 27 and 28, the magnetic piece 6 undergoes similar displacements causing vertical displacements of the control shaft and the absorbent unit.

Similarly, when the position of the inductor is held, the magnetic mass, the control shaft and the absorbent unit stay in a position fixed in the vertical direction.

Regulation of the power of the reactor can therefore be achieved with a mechanism disposed entirely outside the sealed enclosure, transmission of the movement to the control shaft disposed inside the sealed enclosure being obtained by magnetic coupling between the inductor 10 and the magnetic piece 6.

In addition, the magnetic piece 6 is connected at its lower part to the control shaft 3 by a connecting device 4 comprising a piece 36 connected to the end piece of the magnetic assembly 6 and extended downwards by a sleeve 37, the assembly 36,37 being in the shape of a bell covering a piece 35 solid with the control shaft 3.

The connecting device also has an electromagnet 38 fixed to the lower plate 18 of the inductor and encircling the sealed enclosure 1 at the level of the connecting apparatus 35,36,37.

The electromagnet 38 allows connection between the control shaft and the magnetic piece to be obtained when it is supplied, or conversely release of the control shaft and the absorbent unit which are able to drop under the action of their own weight when the current of the electromagnet 38 is cut off.

The electromagnet 38 constitutes the electromagnetic control for the connecting device between the control shaft and the magnetic piece.

In the event of emergency shut-down, dropping of the rods is very rapidly and very reliably obtained by cutting off the current in the electromagnet 38.

To avoid interference between the magnetic field developed by the electromagnet and the magnetic fields developed by the inductor magnets, it is possible to make the end piece of the assembly 6 of a non-magnetic material.

The control shaft 3 has a far smaller diameter than the interior diameter of the sealed enclosure so that, when this shaft drops together with the absorbent unit, in the case of emergency shutdown, there is no resistance to the dropping of the absorbent unit at the level of the control shaft, since a large section is provided for passage of water around this control shaft in the sealed enclosure. Very reliable and very rapid dropping of the rods is therefore obtained.

It will consequently be seen that the principal advantages of the invention are that it allows very accurate and easily controlled displacements of the absorbent unit, for control of the reactor, by means of a mechanism positioned outside the sealed enclosure, transmission of movement to the control shaft and the absorbent unit being obtained by magnetic coupling through the sealed enclosure, and that it also allows the absorbent unit to be made to drop very reliably and rapidly for emergency shutdown.

The invention is not, however, limited to the embodiment just described; it also comprises all the variants thereof.

Thus, in the described embodiment the inductor has a set of magnetic circuits with permanent magnets comprising two poles, but it is also possible to use magnetic circuits with three or four poles, a configuration having to be chosen which allows the best coupling between the inductor and the magnetic piece.

The inductor described has magnetic circuits with radial flux, but it is also possible to envisage an inductor comprising a succession of annular pole pieces presenting radial projections to be sealed enclosure and annular permanent magnets interposed between the pole pieces, these magnetic circuits developing a flux in the axial direction allowing magnetic coupling of the inductor and the central magnetic piece with radial projections.

It is also possible to replace the permanent magnets of the magnetic circuits by coils supplied with electric current for creating a magnetic field.

An inductor can also be envisaged which has a pair of coils saddled about the sealed enclosure and an annular pole piece encircling the coils on the inner face of which annular grooves are provided so as to form projections constituting the pole shoes of the inductor.

An inductor can also be envisaged which is constituted by a solenoid disposed around the sealed enclosure in a piece of magnetic material forming two pole shoes with the same width and the same spacing as the radial projections of the magnetic piece disposed in the sealed enclosure.

For an inductor having a coil, a supply through flexible cables must be provided, as does a flexible electric current supply cable for the electromagnet of the connecting device between the control shaft and the magnetic piece.

In the case of an inductor having one or several coils, it is possible to obtain dropping of the rods by cutting off the current in the inductor, thus uncoupling the magnetic piece and the inductor.

In this instance it is advisable to machine the magnetic piece which drops with the shaft and the control rod so as to provide water passages therein for avoiding braking the fall of the rods.

In the embodiment described, the connection between the control shaft and the magnetic piece is the result of magnetic forces developed in the corresponding pieces connected respectively to the control shaft and the magnetic piece. It is also possible to obtain this connection by mounting on the lower end of the magnetic piece a device with pivoting fingers which can be controlled from outside of the enclosure by an electromagnet. The upper end of the control shaft is then so machined as to provide a groove to allow the pivoting fingers to engage on this shaft.

In the example described, driving of the inductor is effected by mechanical chains and chain wheels driven by an asynchronous motor, but it is also possible to use other driving devices such as chains with welded or cabled links, and other motor devices, such as stepping motors.

The use of two screws vertically disposed and mounted to rotate about their vertical axis in the casing surrounding the sealed enclosure can also be envisaged, these screws cooperating with floating nuts solid with the inductor.

A rack-and-pinion device for driving the inductor can also be envisaged.

The number of pole shoes and annular radial projections on the magnetic piece is clearly determined by the characteristics of the material used, but in all cases the axial distribution of several pole shoes disposed opposite the radial projections on the shaft is favorable to the transverse stability of the magnetic mass when it is displaced.

Instead of a single inductor, a set of inductors moving in synchronism can also be used.

Lastly, the invention is applicable not only to the case of pressurized water nuclear reactors but also to all nuclear reactors whose control is effected by displacement of a unit absorbing the neutrons inside the reactor core, emergency shutdown being obtained by dropping of the absorbent unit under the action of its weight into maximum insertion position.

We claim:

1. Apparatus for controlling a nuclear reactor by vertical displacement of a unit absorbing the neutrons inside the core of the reactor and dropping of the absorbent unit into maximum insertion position under the action of its own weight for emergency shutdown, said absorbent unit being fixed to the lower end of a vertical control shaft (3), said vertical control shaft displaceable into a cylindrical sealed enclosure (1), said enclosure having a vertical axis, and the interior of said enclosure communicating with the interior of said reactor, said apparatus comprising:

(a) a generally cylindrical piece (6) coaxial with and inside said enclosure (1), said piece being made of magnetic material, vertically movable in said enclosure, guided in its displacements and connected to the upper end of said vertical control shaft (3), said cylindrical piece also having a plurality of successive annular projections arranged along the axial direction of the cylindrical piece, said annular projections being of smaller diameter than the internal diameter of said enclosure;

(b) at least one inductor (10) disposed outside of the said enclosure (1), comprising at least two pole shoes (16) axially separated by a distance equal to the space between said successive annular projections, said pole shoes (16) being at a radial distance from the enclosure which allows magnetic coupling between said inductor and said cylindrical piece;

(c) vertically movable mechanical means (22, 23, 24, 26, 27, 28) for accurate guidance and displacement of said inductor (10) in the vertical direction with predetermined stops, said displacements producing a corresponding displacement of said cylindrical piece (6);

(d) electromagnetic control means located outside said enclosure for detachably connecting said cylindrical piece to said vertical control shaft, said magnetic control adapted to release said control shaft and said absorbent unit when electric current to the electromagnet is cut off.

2. Control apparatus according to claim 1, wherein said inductor comprises a vertical stack of magnetic circuits with permanent magnets.

3. Control apparatus according to claim 1, wherein said inductor has at least one coil supplied with electric current.

4. Control apparatus according to claim 3, wherein the means for controlling dropping of the absorbent unit comprises a means for shutting off the current in the supply circuit of the coil of the inductor.

5. Control apparatus according to claim 1, wherein said means for displacing said inductor (10) is constituted by a set of at least two endless chains (26) passing on the one hand over a drive wheel (30) and on the other hand over a guide wheel (31), the drive wheels being driven by an asynchronous motor braked by current starvation.

* * * * *